United States Patent
P N et al.

(10) Patent No.: US 10,972,442 B1
(45) Date of Patent: Apr. 6, 2021

(54) DISTRIBUTED PREDICTIVE PACKET QUANTITY THRESHOLD REPORTING

(71) Applicant: Juniper Networks, Inc., Sunnyvale, CA (US)

(72) Inventors: Guruprasad P N, Bangalore (IN); Reji P Rajesh, Bangalore (IN); Sumeet Mundra, Bangalore (IN); Sundareswaram Pallan Viswanathan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 149 days.

(21) Appl. No.: 16/413,172

(22) Filed: May 15, 2019

(51) Int. Cl.
| | |
|---|---|
| *H04L 29/06* | (2006.01) |
| *H04L 9/08* | (2006.01) |
| *H04L 12/24* | (2006.01) |
| *H04L 12/26* | (2006.01) |

(52) U.S. Cl.
CPC ........ *H04L 63/0428* (2013.01); *H04L 9/0891* (2013.01); *H04L 41/147* (2013.01); *H04L 43/16* (2013.01)

(58) Field of Classification Search
CPC . H04L 63/0428; H04L 9/0891; H04L 41/147; H04L 43/16
See application file for complete search history.

(56) References Cited

U.S. PATENT DOCUMENTS

| | | | | |
|---|---|---|---|---|
| 9,471,777 | B1* | 10/2016 | Juels | .................... G06F 21/45 |
| 2014/0093082 | A1* | 4/2014 | Jung | .................... H04L 9/0891 |
| | | | | 380/270 |
| 2020/0187275 | A1* | 6/2020 | Lopes | .................. H04W 24/02 |

OTHER PUBLICATIONS

Wikipedia, "IEEE 802.1AE", https://en.wikipedia.org/wiki/IEEE_802.1AE, Apr. 15, 2019, 3 pages.

* cited by examiner

*Primary Examiner* — Arvin Eskandarnia
(74) *Attorney, Agent, or Firm* — Harrity & Harrity, LLP

(57) ABSTRACT

A first line card of a first network device may receive packets to be transmitted to a second line card of a second network device. The first line card may predict an earliest satisfaction time for satisfaction of a first packet quantity threshold of one or more packet quantity thresholds. The first line card may transmit the packets to the second line card. The first line card may determine whether a quantity of transmitted packets transmitted by the first line card satisfies the first packet quantity threshold. Based on whether the quantity of transmitted packets satisfies the one or more of the one or more packet quantity thresholds, the first line card may perform one or more actions related to modifying a security key, or may perform one or more other actions related to monitoring transmission of the packets.

20 Claims, 10 Drawing Sheets

US 10,972,442 B1

DISTRIBUTED PREDICTIVE PACKET QUANTITY THRESHOLD REPORTING

BACKGROUND

A communication protocol is a system of rules that allow two or more devices to communicate. The protocol defines the rules, syntax, semantics, and synchronization of communication, and possible error recovery methods. Media access control (MAC) security (MACsec) is one protocol that network devices use to communicate with each other over a secured Ethernet link.

SUMMARY

According to some implementations, a method may include receiving, by a first line card of a first network device, packets to be transmitted to a second line card of a second network device, wherein the packets are to be transmitted from a first interface port of the first line card and via a communications link between the first interface port and a second interface port of the second line card, wherein the communications link is to be secured using a security key; determining, by the first line card, one or more packet quantity thresholds for transmission of the packets, wherein satisfaction of a first packet quantity threshold, of the one or more packet quantity thresholds, causes the first line card to perform one or more actions related to modifying the security key; predicting, by the first line card and after determining the one or more packet quantity thresholds, an earliest satisfaction time for satisfaction of the first packet quantity threshold; transmitting, by the first line card and in association with predicting the earliest satisfaction time, the packets to the second line card; determining, by the first line card in association with transmitting the packets to the second line card and after satisfaction of the earliest satisfaction time, whether a quantity of transmitted packets transmitted by the first line card satisfies one or more of the one or more packet quantity thresholds; and based on whether the quantity of transmitted packets satisfies the one or more of the one or more packet quantity thresholds: performing the one or more actions, or performing one or more other actions related to monitoring transmission of the packets.

According to some implementations, a first line card of a first network device may include one or more memories; and one or more processors, communicatively coupled to the one or more memories, to: one or more processors, communicatively coupled to the one or more memories, to: receive packets to be transmitted to a second line card of a second network device, wherein the packets are to be transmitted from a first interface port of the first line card to a second interface port of the second line card via a communications link secured using a security key; determine one or more packet quantity thresholds for transmission of the packets, wherein satisfaction of one or more of the one or more packet quantity thresholds causes the first line card to perform one or more actions related to modifying the security key or to perform one or more other actions related to monitoring transmission of the packets; predict an earliest satisfaction time for satisfaction of a first packet quantity threshold of the one or more packet quantity thresholds; transmit, in association with predicting the earliest satisfaction time, the packets to the second line card; determine, in association with transmitting the packets to the second line card and after satisfaction of the earliest satisfaction time, whether a quantity of transmitted packets transmitted by the first line card satisfies the first packet quantity threshold; and based on whether the quantity of transmitted packets satisfies the one or more of the one or more packet quantity thresholds: perform the one or more actions, or perform the one or more other actions.

According to some implementations, a non-transitory computer-readable medium may store one or more instructions. The one or more instructions, when executed by one or more processors of a first line card of a first network device, may cause the one or more processors to: receive packets to be transmitted from a first line card of a first network device to a second line card of a second network device, wherein the packets are to be transmitted from a first interface port of the first line card via a communications link between the first interface port and a second interface port of the second line card; determine one or more packet quantity thresholds for transmission of the packets; predict, in association with determining the one or more packet quantity thresholds, an earliest satisfaction time for satisfaction of a first packet quantity threshold of the one or more packet quantity thresholds; transmit, in association with predicting the earliest satisfaction time, the packets to the second line card; determine, in association with transmitting the packets and after satisfaction of the earliest satisfaction time, whether a quantity of transmitted packets transmitted by the first line card satisfies one or more of the one or more packet quantity thresholds; and based on whether the quantity of transmitted packets satisfies the one or more of the one or more packet quantity thresholds: perform one or more actions related to modifying a security key used to encrypt traffic on the communications link, or perform one or more other actions related to monitoring transmission of the packets.

DETAILED DESCRIPTION

Figure 1A:
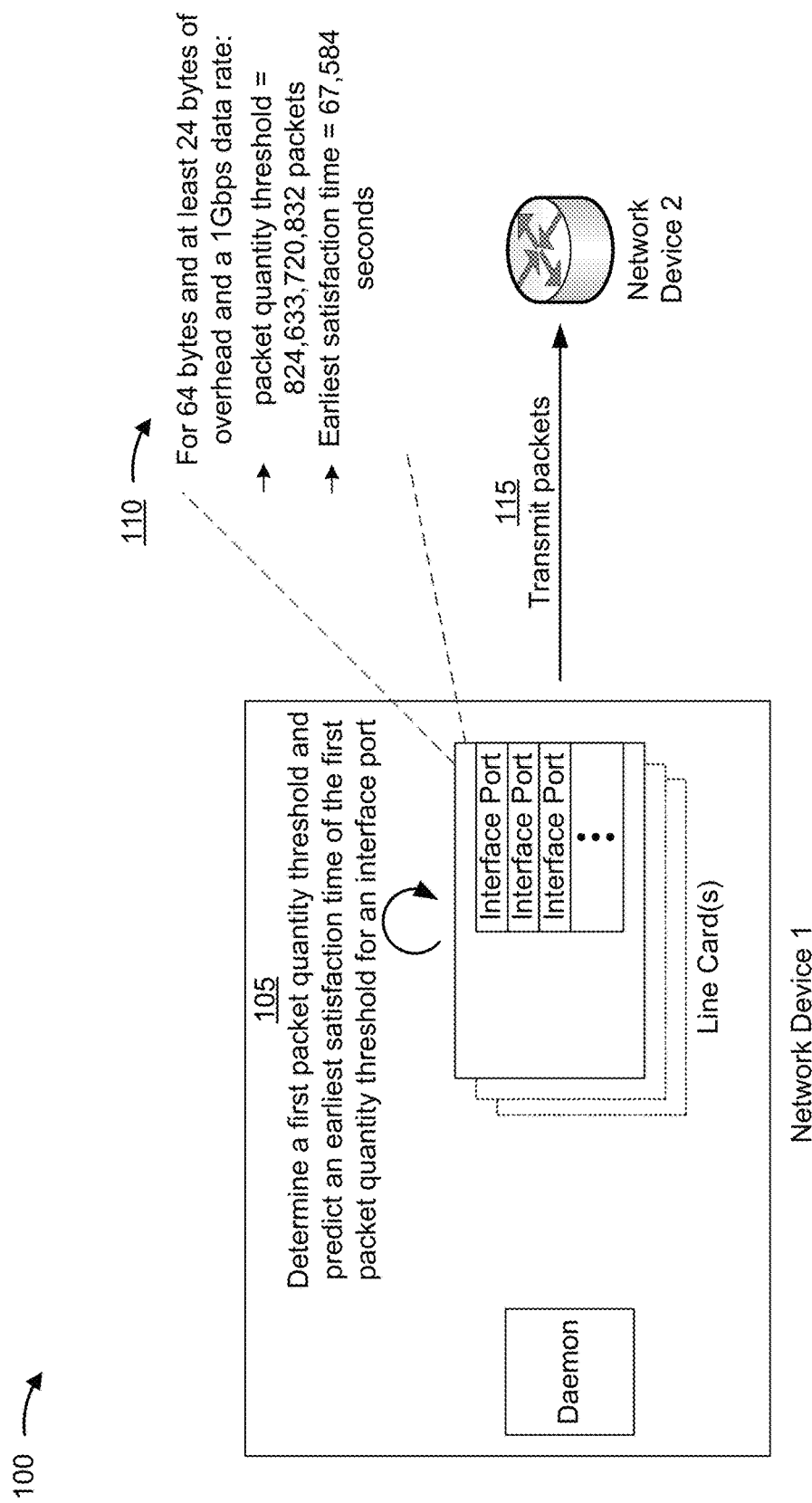
FIGS. 1A-2 are diagrams of one or more example implementations described herein.

The following detailed description of example implementations refers to the accompanying drawings. The same reference numbers in different drawings may identify the same or similar elements.

Various protocols are used for communications between network devices. One example of a secured protocol is a media access control security (MACsec) protocol. During use of the MACsec protocol, security association keys (SAKs) are created and maintained between communicating network devices for encryption and decryption of traffic. A SAK needs to be changed from time to time in order to ensure that a communication link between communicating network devices remains secured. The frequency at which a SAK is changed for a communication link depends on a quantity of packets encrypted using the SAK. For example, once a threshold quantity of packets has been encrypted using a SAK and transmitted, the communicating network devices change the SAK. The particular threshold used can vary based on corresponding configurations of the communicating network devices, such as a cipher suite (e.g., an extended packet number (XPN) cipher suite or a non-XPN cipher suite) that the communicating network devices are using. As a result, the communicating network devices need to maintain information regarding a quantity of packets that have been encrypted using a particular SAK and/or transmitted after encryption using the SAK. This information is periodically exchanged between communicating network devices so that network devices associated with a communication session can both switch a SAK at the correct time.

A network device includes multiple line cards, each with multiple physical interface ports. The network device reads statistics for quantities of packets encrypted on various interface ports using corresponding SAKs from the various interface ports. For example, a daemon of the network device queries the statistics from the line cards. The network device then uses this information to determine whether to switch the SAK for each interface port. This is a centralized model where SAK switching is controlled by a central controller (e.g., a daemon) for all interface ports associated with the network device. Depending on the configuration of the network device, gathering packet-related statistics from hardware by a line card in this manner can occur over a slow communication bus, such as a management data input/output (MDIO) bus, which can cause significant consumption of processing resources through repeated accessing of hardware. Or, if the network device is capable of interrupting transmission of packets while processing packet-related statistics, these techniques can introduce significant latency into communications between network devices, can introduce significant latency into access of the interface ports by various applications, and/or the like, particularly as these techniques are performed iteratively over a time period.

In addition, these techniques are not scalable for large quantities of MACsec sessions (e.g., thousands, or more, of MACsec sessions across multiple line cards). For example, line cards can support multiple virtual ports (secY ports), with separate MACsec sessions, within an interface port, such as 128 or more virtual ports. Processing packet-related statistics for this large quantity of MACsec sessions by a centralized daemon consumes significant processing resources of the network device. In this scenario, the centralized daemon on the network device is continuously attempting to query packet-related statistics (e.g., while waiting for a response to a query for one interface, the network device will be sending queries for packet-related statistics for dozens, hundreds, or more other interfaces). This creates a high likelihood of delayed and/or missed processing of messages related to maintaining a MACsec session (e.g., MACsec key agreement (MKA) keep alive messages), thereby resulting in erroneous timeout of the MACsec session and interruptions to communications. In addition, computing resources of the network device are consumed by making corresponding inter-process communication (IPC) message calls to the various line cards for the packet-related statistics queries.

Some implementations described herein provide for distributed predictive packet quantity threshold reporting by a network device in a scaled scenario. For example, line cards of the network device may predict satisfaction of a threshold quantity of packets encrypted using a security key (e.g., a SAK), and may cause the security key (e.g., modify the SAK) to be updated based on the predicted satisfaction. Continuing with the previous example, some implementations described herein use prediction to predict satisfaction of a threshold and/or to control requests (e.g., hardware access) for packet-related statistics rather than using periodic requests (e.g., periodic hardware reads) for the packet-related statistics. In addition, some implementations described herein utilize processing on individual line cards of a network device, rather than centralized processing by a daemon for all line cards, to check packet-related statistics and/or to determine whether corresponding thresholds for various interface ports are satisfied. These techniques reduce a quantity of requests for packet-related statistic, thereby conserving processing resources of the network device. In addition, these techniques reduce or eliminate interruptions to communications and/or operations of the network device that would otherwise occur using previous techniques, thereby reducing latency that would otherwise be introduced into the communications and/or the operations. Further, some implementations described herein reduce or eliminate repeated occurrences of access to hardware (e.g., access to hardware of a network device by a daemon of the network device) via use of prediction for packet quantity threshold satisfaction, thereby conserving processing resources that would otherwise be consumed as a result of a higher quantity of occurrences of access to the hardware.

FIGS. 1A-1D are diagrams of one or more example implementations 100 described herein. As shown in FIG. 1A, implementation 100 includes a network device 1 and a network device 2. In addition, as shown in FIG. 1A, network device 1 may include a daemon and multiple line cards. Further, as shown in FIG. 1A, a line card may include multiple interface ports (e.g., physical interface ports) that are associated with corresponding communications links between the network device 1 and the network device 2.

As shown in FIG. 1A, and by reference number 105, a line card of the network device 1 may determine a first packet quantity threshold and may predict an earliest satisfaction time of the first packet quantity threshold for an interface port. For example, the line card may determine the first packet quantity threshold and may predict the earliest satisfaction time after the interface port is activated, in association with transmitting packets via the interface port, in association with generating a security key (e.g., an SAK when a MACsec protocol is to be used for the interface port), after receiving the packets from an endpoint device (not shown), and/or the like. Satisfaction of the first packet quantity threshold may cause the network device 1 to modify the security key for a communications link. The earliest satisfaction time may be a minimum amount of time between starting transmission of packets using a security key and satisfaction of the first packet quantity threshold based on various factors described below. The first packet quantity threshold and the earliest satisfaction time may be associated with an interface port of a line card of the network device 1. In other words, the line card may determine corresponding packet quantity thresholds and earliest satisfaction times for multiple interface ports associated with the line card. The various line cards of the network device 1 may each perform similar determinations for corresponding interface ports.

The first packet quantity threshold may be based on a cipher suite that the network device 1 is using (e.g., a cipher suite, such as a Galois/counter mode (GCM)-128-advanced encryption standard (AES) (GCM-128-AES) cipher suite or a GCM-256-AES cipher suite, associated with a configuration (e.g., a MACsec configuration) on a line card of the network device 1). For example, different cipher suites may be associated with different packet quantity thresholds. Continuing with the previous example, the line card may determine one packet quantity threshold for an XPN cipher suite and may determine another packet quantity threshold for a non-XPN cipher suite (e.g., where the first cipher suite and the second cipher suite are different). The first packet quantity threshold may be based on one or more other factors, such as a network with which the network device 1 and/or the network device 2 are associated (e.g., a private network may be associated with a lower threshold than a public network so that SAKs are changed more frequently), a priority or security level associated with packets to be transmitted from the network device 1 (e.g., high priority or high security level packets may be associated with a lower threshold than lower priority or lower security packets so that SAKs are changed more frequently), and/or the like. In this way, the first packet quantity threshold can be dynamically adjusted according to various factors that may be indicative of an amount of security needed for a communications link (e.g., lower packet quantity thresholds result in more frequent modification of security keys, thereby resulting in more secure communications links).

The earliest satisfaction time for the first packet quantity threshold may be based on a smallest expected packet size (e.g., including header data, payload data, trailer data, and/or the like) to be transmitted via the interface port, a data rate (e.g., a maximum and/or expected data rate) of the interface port (or a communications link between the interface port and another interface port), and/or the like. For example, the line card may predict the earliest satisfaction time by dividing the first packet quantity threshold by a result of dividing the data rate by the smallest expected packet size. This determination results in a minimum amount of time for transmission of packets to satisfy the first packet quantity threshold (e.g., the minimum amount of time will be achieved if all packets are transmitted using the smallest expected packet size and utilizing the full available data rate).

In some implementations, the line card may determine the first packet quantity threshold and/or may predict the earliest satisfaction time using a machine learning model. For example, the machine learning model may have been trained on a training set of data that identifies actual quantities of packets transmitted for various amounts of time and corresponding factors related to the packets transmitted. In addition, the training set of data may identify corresponding packet quantity thresholds and/or earliest satisfaction times for the quantities of packets transmitted and information that identifies whether the corresponding packet quantity thresholds were satisfied prior to the earliest satisfaction times. Based on having been trained, the line card may use the machine learning model to process information that identifies the various factors described above, the smallest expected packet size, the data rate, and/or the like to determine the first packet quantity threshold and/or may predict the earliest satisfaction time for an interface port.

In association with determining the first packet quantity threshold and predicting the earliest satisfaction time, the line card may generate a security key to be used for the communications link for which the network device 1 is performing the operations described herein. For example, and in the context of a MACsec protocol, the line card may generate a SAK for a communications link between one interface of one line card of the network device 1 and one interface of one line card of the network device 2. Alternatively, the SAK may apply to a communications link between one interface of the network device 1 and multiple interface ports (e.g., of a same line card, of different line cards of the same network device or of different network devices, and/or the like).

Reference number 110 shows an example of determining a first packet quantity threshold and predicting an earliest satisfaction time. Assume, for example, that the first packet quantity threshold is 824,633,720,832 packets (e.g., 0xC000000000 in hexadecimal format) for a cipher suite used by network device 1 and/or network device 2. Further assume, for example, that the smallest expected packet size for a packet that the network device 1 is to transmit is 64 bytes of payload (e.g., an Ethernet frame size) and at least 24 bytes of MACsec overhead (e.g., header, trailer, and/or the like), assuming no secure channel identifier (SCI). Further assume, for example, that the data rate on the interface port is 1 gigabyte per second (Gbps). In this case, the line card may predict that the earliest satisfaction time for the first packet quantity threshold is 67,584 seconds by dividing 824,633,720,832 packets by a result of dividing 1 Gbps (or 1,073,741,824 bytes per second) by the smallest expected packet size of 88 bytes (64 bytes plus of payload plus 24 bytes of overhead). In other words, 67,584=(824,633,720,832 packets/(1,073,741,824 bytes per second/(64 bytes+24 bytes))), using the example values provided above.

The line card may determine a second packet quantity threshold based on the first packet quantity threshold, the earliest satisfaction time, and/or the like. For example, the second packet quantity threshold may be a packet quantity threshold associated with a period of time less than the earliest satisfaction time, a percentage of the first packet quantity threshold, and/or the like. As a specific example, the line card may determine a second packet quantity threshold for a 10 second period of time at the smallest expected packet size and data rate. Continuing with the previous example, 10 seconds of transmission of packets at the 88 byte smallest expected packet size, the 1 Gbps data rate, and the 824,633,720,832 packet quantity threshold from above may equal 122,500,000 packets for the second packet quantity threshold. The network device 1 may use the second packet quantity threshold for triggering various actions, as described below. For example, satisfaction of the second packet quantity threshold may cause the line card to perform one or more actions related to modifying a security key, or to perform one or more other actions related to monitoring transmission of packets from an interface port of the line card.

The period of time with which the second packet quantity threshold is associated may be pre-configured, may be arbitrarily selected, or may be based on one or more factors. For example, the one or more factors may include an actual expected packet size of packets to be transmitted (e.g., larger packet sizes may be associated with longer periods of time), a frequency at which the network device 1 would have queried the line cards for packet-related statistics using prior techniques, a priority or a security level associated with the packets (e.g., higher relative priorities and/or security levels may be associated with shorter periods of time), and/or the like. Additionally, or alternatively, the line card may determine the period of time using a machine learning model similar to that described above.

As shown by reference number 115, the line card may transmit packets to the network device 2. For example, the line card may transmit the packets in association with determining the first packet quantity threshold, the second packet quantity threshold, and/or the earliest satisfaction time. The line card may encrypt the packets (and the network device 2 may decrypt the packets after receiving the packets) using the security key generated for the communications link via which the packets are transmitted. Other line cards of the network device 1 may transmit packets in a manner similar to that described herein.

The line card may transmit the packets for an amount of time that equals the earliest satisfaction time. For example, the line card may initiate a timer based on initiating transmission of the packets, where the value of the timer equals the earliest satisfaction time, and may transmit the packets without performing actions related to packet-related statistics until the timer expires. Additionally, or alternatively, the line card may use a timestamp for initiation of transmission of the packets and the earliest satisfaction time to determine a time at which the network device 1 is to stop transmitting the packets (e.g., by adding the earliest satisfaction time to the timestamp). By utilizing the smallest packet quantity and the earliest satisfaction time, the network device 1 has determined a worst case scenario for satisfaction of the first packet quantity threshold (e.g., a shortest amount of time, based on expected or known information, for which the line card may transmit packets before satisfying the first packet quantity threshold). This reduces or eliminates a need for accessing hardware for gathering of packet-related statistics (e.g., for periodic access to hardware for gathering of packet-related statistics) prior to the earliest satisfaction time being satisfied, thereby conserving computing resources, reducing interruptions to the transmission of packets, and/or the like relative to previous techniques. Satisfaction of an earliest satisfaction time may not cause transmission of packets to be paused or stopped.

Figure 1B:
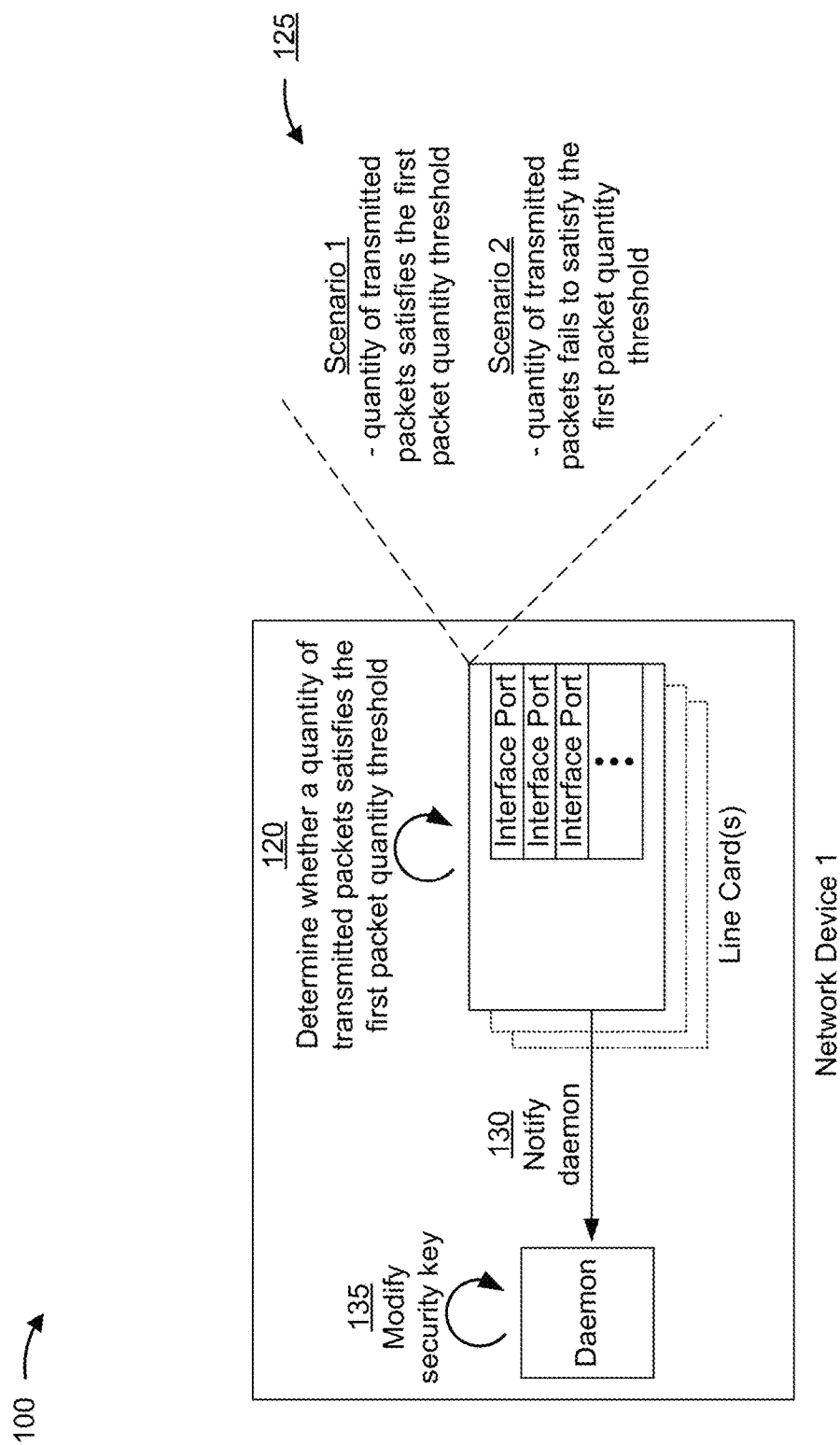

Turning to FIG. 1B, and as shown by reference number 120, the line card may determine whether a quantity of transmitted packets satisfies the first packet quantity threshold. For example, the line card may determine whether the quantity of transmitted packets transmitted in association with reference number 115 satisfies the first packet quantity threshold (e.g., the network device may continue to transmit packets after satisfaction of the earliest satisfaction time and satisfaction of the earliest satisfaction time may cause one or more actions related to packet statistics, described herein, to be performed). In some implementations, the line card may make a determination regarding whether the quantity of transmitted packets satisfies the first packet quantity threshold on a per-interface basis based on monitoring transmission of packets via an interface.

As shown by reference number 125, various scenarios may occur depending on whether the quantity of transmitted packets satisfies the first packet quantity threshold. For example, a first scenario, and a first set of operations to be performed by the line card, may be based on the quantity of transmitted packets satisfying the first packet quantity threshold. Alternatively, a second scenario, and a second set of operations, different than the first set of operations, may be based on the quantity of transmitted packets failing to satisfy the first packet quantity threshold.

As shown by reference number 130, when the first scenario occurs, the line card may notify the daemon of the satisfaction of the first packet quantity threshold. For example, the line card may send a message (e.g., an interprocess communication (IPC) message) to the daemon. As shown by reference number 135, after receiving the message, the daemon may modify the security key for the communications link (e.g., may generate a new security key to be used for the communications link). In some cases, the line card may modify the security key of the communications link (rather than the daemon modifying the security key). Additionally, or alternatively, the line card and/or daemon may stop transmission of additional packets until the security key has been modified. Additionally, or alternatively, the line card and/or the daemon may send a message to the network device 2 to cause the network device 2 to modify the security key. Additionally, or alternatively, the line card may reset or re-determine the first packet quantity threshold, the second packet quantity threshold, the earliest satisfaction time, the quantity of transmitted packets, and/or the like and may initiate transmission of the packets again in a manner similar to that described above.

The line card may perform the operations described with regard to reference numbers 120 through 135 for multiple interfaces of the line card. In addition, other line cards of the network device 1 may perform similar operations to that described with regard to reference numbers 120 through 135. For example, the other line cards may determine whether various quantities of transmitted packets corresponding to different interface ports satisfy corresponding first packet quantity thresholds and may notify the daemon and/or perform actions as described elsewhere herein.

Figure 1C:
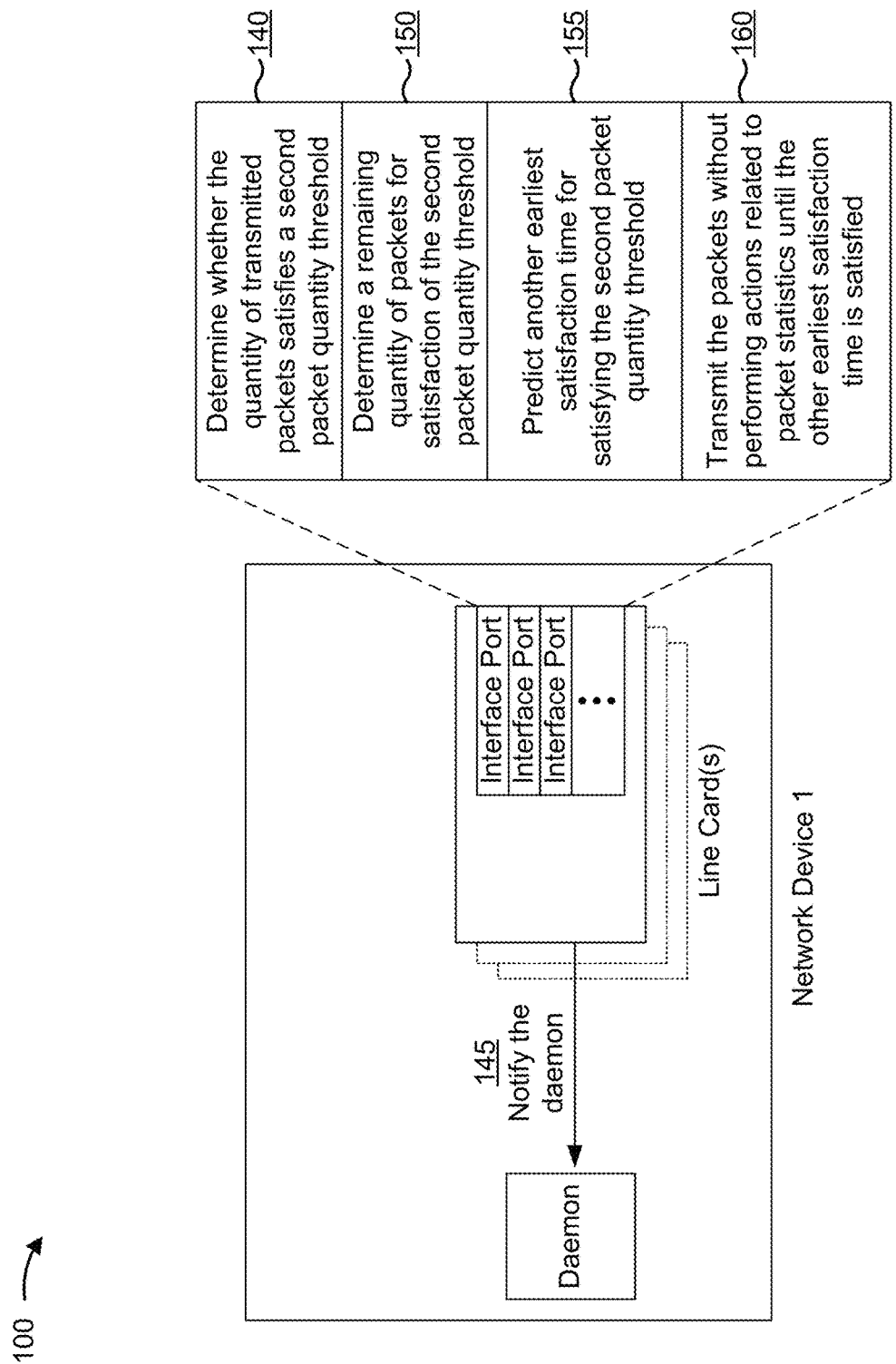

Turning to FIG. 1C, the line card may perform various actions if the second scenario occurs (e.g., where the quantity of transmitted packets fails to satisfy the first packet quantity threshold). As shown by reference number 140, the line card may determine whether the quantity of transmitted packets satisfies a second packet quantity threshold. For example, the second packet quantity threshold may have been determined in association with determining the first packet quantity threshold, as described above. As shown by reference number 145, if the line card determines that the quantity of transmitted packets satisfies the second packet quantity threshold, then the line card may notify the daemon of the satisfaction in a manner similar to that described elsewhere herein. The daemon and/or the line card may modify the security key for a communications link associated with the second packet quantity threshold in a manner similar to that described elsewhere herein.

As shown by reference number 150, if the line card determines that the quantity of transmitted packets fails to satisfy the second packet quantity threshold, then the line card may determine a remaining quantity of packets for satisfaction of the second packet quantity threshold. For example, the line card may determine a difference between the second packet quantity threshold and the quantity of transmitted packets to determine the remaining quantity of packets for satisfaction of the second packet quantity threshold.

As shown by reference number 155, after the line card has determined the remaining quantity of packets, the line card may predict another earliest satisfaction time for satisfying the second packet quantity threshold. For example, the line card may predict the other earliest satisfaction time based on the remaining quantity of packets and the data rate. Continuing with the previous example, the line card may determine an amount of time for satisfying the second packet quantity threshold at the data rate based on the smallest expected packet size and may predict the other earliest satisfaction time based on this amount of time, in a manner similar to that described above.

As shown by reference number 160, the line card may transmit the packets without performing actions related to packet statistics until the other earliest satisfaction time is satisfied. After the other earliest satisfaction time is satisfied, the line card may determine whether the quantity of transmitted packets satisfies the second packet quantity threshold, in a manner similar to that described above.

If the line card determines that the quantity of transmitted packets fails to satisfy the second packet quantity threshold, then the line card may determine a new remaining quantity of packets, a new earliest satisfaction time for satisfaction of the second packet quantity threshold based on the new remaining quantity of packets, and may determine whether a quantity of transmitted packets satisfies the second packet quantity threshold after the new earliest satisfaction time is satisfied. The line card may continue this pattern until satisfaction of the second packet quantity threshold, at which point the line card may perform operations described below in connection with FIG. 1D. In this way, the line card evaluates satisfaction of a threshold related to a quantity of packets transmitted less frequently than previous techniques.

The line card may perform the operations described with regard to reference numbers 140 through 160 for multiple interfaces of the line card. In addition, other line cards of the network device 1 may perform similar operations to that described with regard to reference numbers 140 through 160. For example, the other line cards may determine whether various quantities of transmitted packets corresponding to different interface ports satisfy corresponding second packet quantity thresholds and may notify the daemon or may perform actions as described elsewhere herein.

Figure 1D:
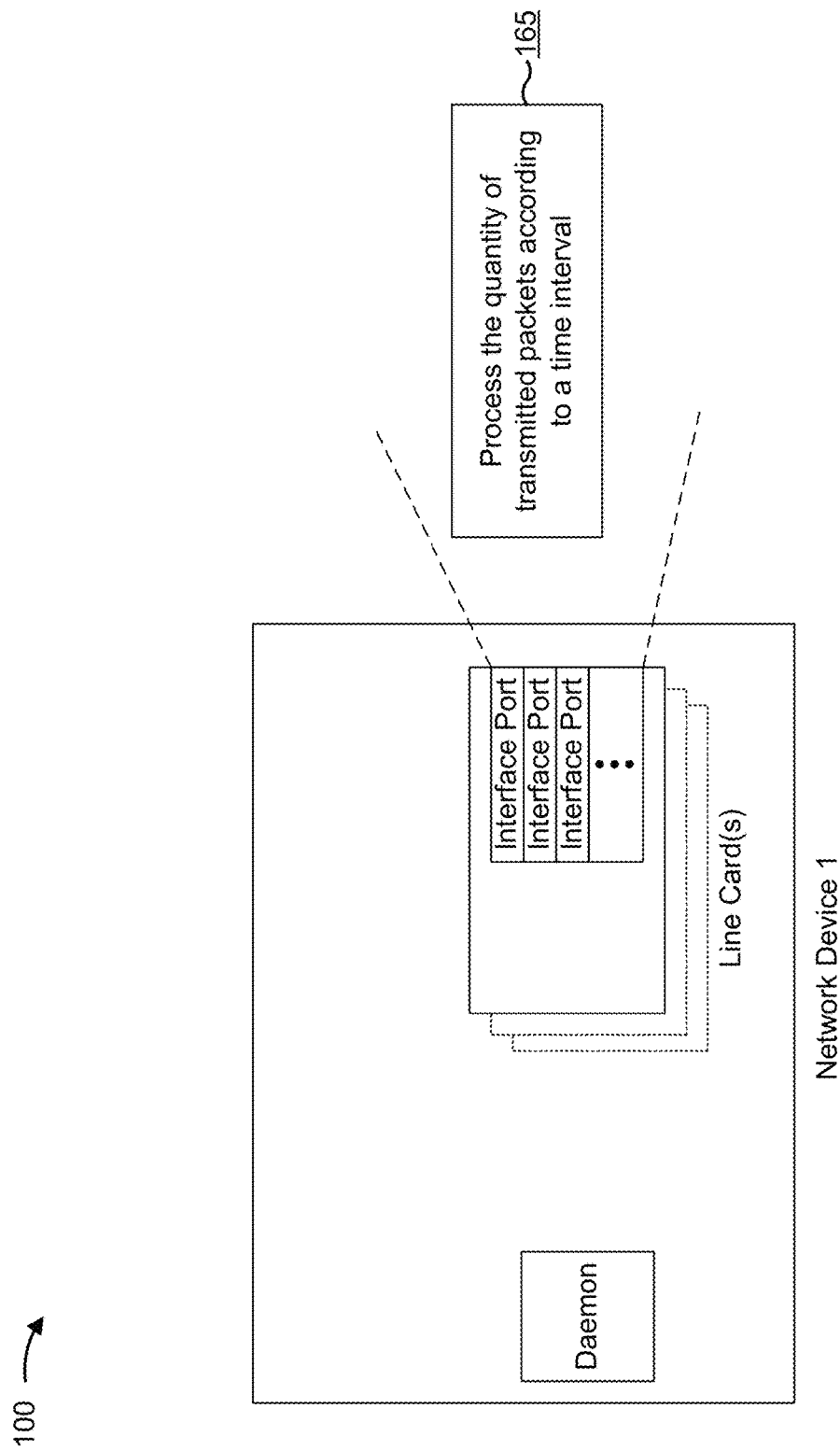

Turning to FIG. 1D, and as shown by reference number 165, the line card may process the quantity of transmitted packets according to a time interval. For example, after the line card determines that the second packet quantity threshold has been satisfied, the line card may determine whether the quantity of transmitted packets satisfies the first packet quantity threshold according to a time interval (e.g., performing an action according to a time interval may include performing the action every 10 seconds, every minute, and/or the like). In this way, the line card processes the quantity of transmitted packets more frequently as the quantity of transmitted packets increases closer to the first packet quantity threshold. After satisfaction of the first packet quantity threshold, the line card may notify the daemon so that the daemon can modify the security key, or, in some cases, the line card may modify the security key. Additionally, or alternatively, after the line card determines that the quantity of transmitted packets satisfies the second packet quantity threshold, the line card may notify the daemon so that the daemon can schedule modification of the security key based on a predicted time for satisfaction of the first packet quantity threshold based on the quantity of packets transmitted and an amount of time for transmitting the quantity of transmitted packets.

In some implementations, the network device 1 (or a component thereof) may output information (e.g., to the network device 2, for display, and/or the like) that indicates that the first packet quantity threshold and/or the second packet quantity threshold have been satisfied, that the security key has been modified, and/or the like. Additionally, or alternatively, the network device 1 (or a component thereof) may generate a report that includes information identifying an amount of time that actually elapsed before satisfaction of one or more of the thresholds described above, a quantity of times that the security key was modified, and/or the like. Additionally, or alternatively, the network device 1 (or a component thereof) may update a machine learning model described herein based on this information (e.g., to more accurately determine one or more of the thresholds described herein, to more accurately predict an amount of time for satisfaction of one or more of the thresholds, and/or the like).

The line card may perform the operations described with regard to reference number 165 for multiple interfaces of the line card. In addition, other line cards of the network device 1 may perform similar operations to that described with regard to reference number 165. For example, the other line cards may process various quantities of transmitted packets according to a time interval for various interfaces or may perform various actions described elsewhere herein.

In this way, a network device may use a distributed and predictive technique for determining when to modify a security key used to secure packets transmitted via a communications link. The technique may be distributed in that various line cards (rather than a centralized daemon) monitor quantities of packets transmitted via interfaces of the line cards. This reduces or eliminates latency in detecting satisfaction of a packet quantity threshold, which reduces or eliminates a likelihood of a quantity of transmitted packets exceeding the threshold (or exceeding the threshold by a threshold amount). Improved detection of satisfaction of a packet quantity threshold improves a security of a communications link by preventing delay in modification of a security key used to secure traffic on the communications link. The technique may be predictive in that a line card may iteratively predict earliest satisfaction times for a packet quantity threshold based on various factors. This reduces or eliminates a need for the line card to periodically check for satisfaction of the packet quantity threshold, thereby conserving processing resources that would otherwise be consumed as a result of the periodic checking. In addition, this reduces or eliminates interruptions to communications between network devices that would otherwise occur as a result of periodic checking, thereby improving communications between the network devices and/or reducing latency that would otherwise be introduced to the communications as a result of the interruptions.

As indicated above, FIGS. 1A-1D are provided as one or more examples. Other examples may differ from what is described with regard to FIGS. 1A-1D. For example, although FIGS. 1A-1D use the MACsec protocol as an example in some cases, the implementations apply equally to other protocols that may use a security key for encrypting traffic where the security key is updated based on transmission of a threshold quantity of packets. In addition, although the implementations are described in the context of various quantities of packets, other options for the implementations are possible. For example, the implementations described herein may be based on an amount of data transmitted rather than a quantity of packets transmitted. Further, although described in the context of transmitting packets, the implementations apply equally to receiving packets. For example, a network may determine various thresholds related to receiving packets, may monitor a quantity of packets received, and may update a security key after a threshold quantity of packets has been received, in a manner similar to that described above.

Figure 2:
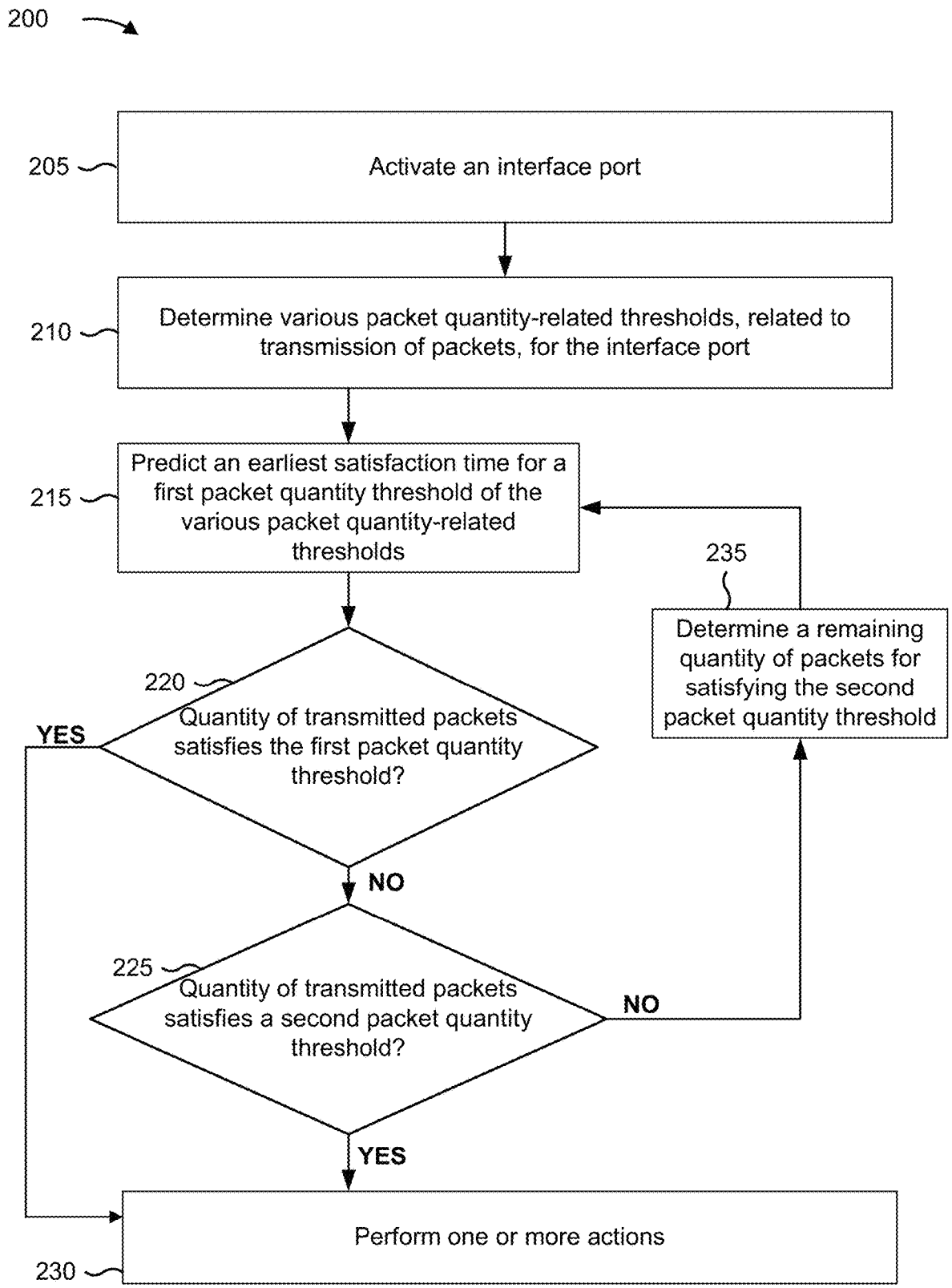

FIG. 2 is a diagram of one or more example implementations described herein. FIG. 2 shows a flow chart of an example process 200 for distributed predictive packet quantity threshold reporting. In some implementations, one or more process blocks of FIG. 2 may be performed by a line card of a network device (e.g., the network device 1 of FIGS. 1A-1D). In some implementations, one or more process blocks of FIG. 2 may be performed by another component of the network device separate from or including the line card, such as a daemon of the network device (e.g., the daemon of FIGS. 1A-1D).

As shown in FIG. 2, process 200 may include activating an interface port (block 205). For example, the line card may activate the interface port to facilitate transmission of packets via the interface port. The line card may activate the interface port by powering on the interface port. In addition, the line card may establish a communications link between the interface port and another interface port of another network device. For example, the line card may generate a security key (e.g., an SAK for a MACsec protocol) to be used to encrypt and/or decrypt packets transmitted via the communications link.

As further shown in FIG. 2, process 200 may include determining various packet quantity-related thresholds, related to transmission of packets, for the interface port (block 210). For example, the line card may determine the various packet quantity-related thresholds for the interface port after activating the interface port. The various packet quantity-related thresholds may be related to a quantity of packets transmitted via the interface port. The line card may determine a first packet quantity threshold, may determine a second packet quantity threshold, and/or the like in a manner similar to that described elsewhere herein.

As further shown in FIG. 2, process 200 may include predicting an earliest satisfaction time for a first packet quantity threshold of the various packet quantity-related thresholds (block 215). For example, the line card may predict the earliest satisfaction time for the first packet quantity threshold in a manner similar to that described elsewhere herein. The earliest satisfaction time may be an earliest time at which the line card could satisfy the first packet quantity threshold based on an expected smallest packet size, a data rate of the interface port, and/or the like, as described elsewhere herein. The line card may transmit packets via the interface port and may determine whether the first packet quantity threshold is satisfied after the earliest satisfaction time is satisfied.

As further shown in FIG. 2, process 200 may include determining whether a quantity of transmitted packets satisfies the first packet quantity threshold (block 220). For example, the line card may determine whether a quantity of transmitted packets satisfies the first packet quantity threshold after the earliest satisfaction time is satisfied, in a manner similar to that described elsewhere herein. If the line card determines that the quantity of transmitted packets satisfies the first packet quantity threshold (block 220—YES), then process 200 may include performing one or more actions, as described elsewhere herein.

As further shown in FIG. 2, if the line card determines that the quantity of transmitted packets fails to satisfy the first packet quantity threshold (block 220—NO), then process 200 may include determining whether the quantity of transmitted packets satisfies a second packet quantity threshold (block 225). For example, the line card may determine whether the quantity of transmitted packets satisfies the second packet quantity threshold after determining that the quantity of transmitted packets fails to satisfy the first packet quantity threshold, in a manner similar to that described elsewhere herein.

As further shown in FIG. 2, if the line card determines that the quantity of transmitted packets satisfies the second packet quantity threshold (block 225—YES), then process 200 may include performing one or more actions (block 230). For example, the line card may transmit packets and may determine, according to a time interval, whether the quantity of transmitted packets satisfies the first packet quantity threshold based on determining that the quantity of transmitted packets satisfies the second packet quantity threshold, in a manner similar to that described elsewhere herein. Additionally, or alternatively, and as another example, the line card may notify the daemon when the quantity of transmitted packets satisfies the first packet quantity threshold based on determining that the quantity of transmitted packets satisfies the second packet quantity threshold, in a manner similar to that described elsewhere herein.

As further shown in FIG. 2, if the line card determines that the quantity of transmitted packets fails to satisfy the second packet quantity threshold (block 225—NO), then process 200 may include determining a remaining quantity of packets for satisfying the second packet quantity threshold (block 235). For example, the line card may determine the remaining quantity of packets for satisfying the second packet quantity threshold by subtracting the quantity of transmitted packets from the second packet quantity threshold based on determining that the quantity of transmitted packets fails to satisfy the second packet quantity threshold, in a manner similar to that described elsewhere herein. The line card may predict a new earliest satisfaction time for the quantity of transmitted packets to satisfy the second packet quantity threshold based on the remaining quantity of packets and may continue to transmit the packets, in a manner similar to that described elsewhere herein. After satisfaction of the new earliest satisfaction time, the line card may determine whether the quantity of transmitted packets satisfies the second packet quantity threshold, and may perform various actions depending on whether the quantity of transmitted packets satisfies the second packet quantity threshold, as described elsewhere herein.

As indicated above, FIG. 2 is provided as an example. Other examples may differ from what is described with regard to FIG. 2.

Figure 3:
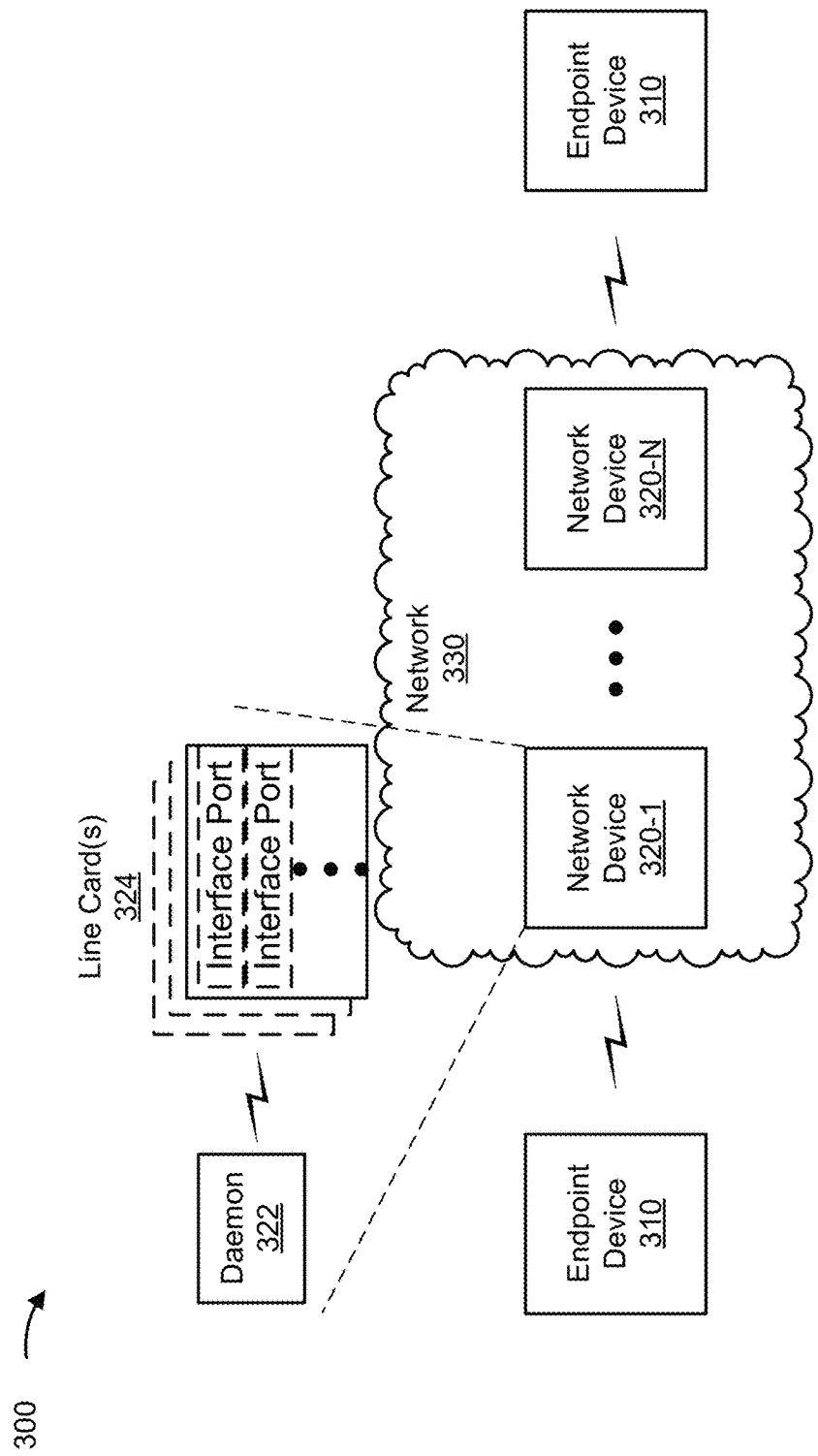
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more endpoint devices 310, a group of network devices 320 (shown as network device 320-1 through network device 320-N) that each include a daemon 322 and line card(s) 324, and a network 330. Devices of environment 300 may interconnect via wired connections, wireless connections, or a combination of wired and wireless connections.

Endpoint device 310 includes one or more devices capable of receiving, generating, storing, processing, and/or providing information, such as information described herein. For example, endpoint device 310 may include a mobile phone (e.g., a smart phone, a radiotelephone, etc.), a laptop computer, a tablet computer, a desktop computer, a handheld computer, a gaming device, a wearable communication device (e.g., a smart watch or a pair of smart glasses), a network device, or a similar type of device. In some implementations, endpoint device 310 may receive network traffic from and/or may provide network traffic to other endpoint devices 310 via network 330 (e.g., by routing packets using network devices 320 as intermediaries).

Network device 320 includes one or more devices capable of receiving, processing, storing, routing, and/or providing traffic in a manner described herein. For example, network device 320 may include a router, a gateway, a switch, a firewall, a hub, a bridge, a reverse proxy, a server (e.g., a proxy server, a cloud server, a data center server, and/or the like), a load balancer, and/or a similar device. In some implementations, network device 320 may be a physical device implemented within a housing, such as a chassis. In some implementations, network device 320 may be a virtual device implemented by one or more computer devices of a cloud computing environment or a data center. In some implementations, network device 320 may provide traffic to another network device 320, as described elsewhere herein. In some implementations, two network devices 320 may communicate via a communications link (e.g., a communications link secured using MACsec protocol).

Network device 320 may include a daemon 322. Daemon 322 is a component of network device 320 that performs and/or controls various operations of network device 320 and/or one or more other components of network device 320. In some implementations, daemon 322 may receive, from line card 324, a notification of satisfaction of a packet quantity threshold, and may modify a security key, as described elsewhere herein. As further shown in FIG. 3, network device 320 may include line card(s) that each include one or more interface ports. Line card 324 is a component of network device 320 that controls traffic transmission and/or reception via the interface ports associated with line card 324. In some implementations, line card 324 may determine whether a packet quantity threshold has been satisfied for an interface port, and may notify daemon 322 of the satisfaction, as described elsewhere herein.

Network 330 includes one or more wired and/or wireless networks. For example, network 330 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
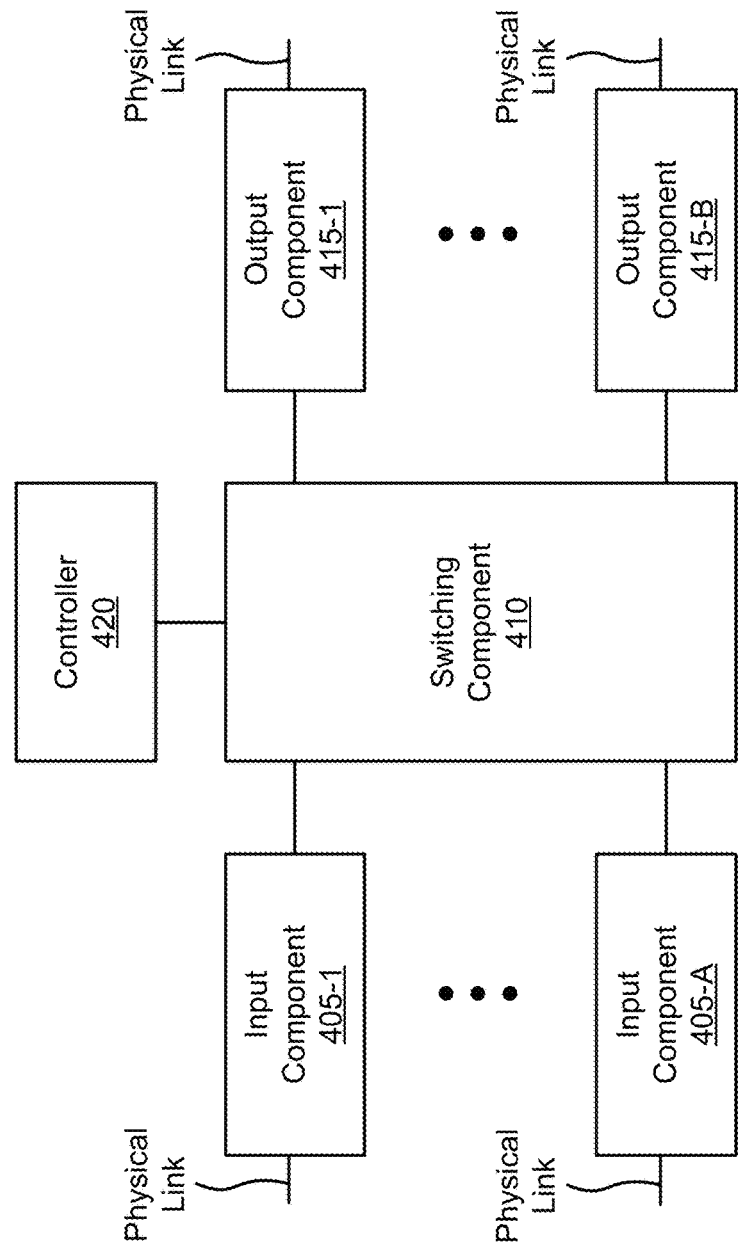
FIG. 4 is a diagram of example components of one or more devices of FIG. 3.

FIG. 4 is a diagram of example components of a device 400. Device 400 may correspond to endpoint device 310 and/or network device 320. In some implementations, endpoint device 310 and/or network device 320 may include one or more devices 400 and/or one or more components of device 400. As shown in FIG. 4, device 400 may include one or more input components 405-1 through 405-A (A≥1) (hereinafter referred to collectively as input components 405, and individually as input component 405), a switching component 410, one or more output components 415-1 through 415-B (B≥1) (hereinafter referred to collectively as output components 415, and individually as output component 415), and a controller 420.

Input component 405 may be points of attachment for physical links and may be points of entry for incoming traffic, such as packets. Input component 405 may process incoming traffic, such as by performing data link layer encapsulation or decapsulation. In some implementations, input component 405 may send and/or receive packets. In some implementations, input component 405 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 405.

Switching component 410 may interconnect input components 405 with output components 415. In some implementations, switching component 410 may be implemented via one or more crossbars, via busses, and/or with shared memories. The shared memories may act as temporary buffers to store packets from input components 405 before the packets are eventually scheduled for delivery to output components 415. In some implementations, switching component 410 may enable input components 405, output components 415, and/or controller 420 to communicate.

Output component 415 may store packets and may schedule packets for transmission on output physical links. Output component 415 may support data link layer encapsulation or decapsulation, and/or a variety of higher-level protocols. In some implementations, output component 415 may send packets and/or receive packets. In some implementations, output component 415 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 415. In some implementations, input component 405 and output component 415 may be implemented by the same set of components (e.g., an input/output component may be a combination of input component 405 and output component 415).

Controller 420 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor or processing component. The processor is implemented in hardware, firmware, and/or a combination of software and hardware. In some implementations, controller 420 may include one or more processors that can be programmed to perform a function.

In some implementations, controller 420 may include a random-access memory (RAM), a read only memory (ROM), and/or another type of dynamic or static storage device (e.g., a flash memory, a magnetic memory, an optical memory, etc.) that stores information and/or instructions for use by controller 420.

In some implementations, controller 420 may communicate with other devices, networks, and/or systems connected to device 400 to exchange information regarding network topology. Controller 420 may create routing tables based on the network topology information, create forwarding tables based on the routing tables, and forward the forwarding tables to input components 405 and/or output components 415. Input components 405 and/or output components 415 may use the forwarding tables to perform route lookups for incoming and/or outgoing packets. In some cases, controller 420 may create a session table based on information determined while initializing a link fault detection session, and may forward the session table to input components 405 and/or output components 415.

Controller 420 may perform one or more processes described herein. Controller 420 may perform these processes in response to executing software instructions stored by a non-transitory computer-readable medium. As used herein, the term "computer-readable medium" refers to a non-transitory memory device. A memory device includes memory space within a single physical storage device or memory space spread across multiple physical storage devices.

Software instructions may be read into a memory and/or storage component associated with controller 420 from another computer-readable medium or from another device via a communication interface. When executed, software instructions stored in a memory and/or storage component associated with controller 420 may cause controller 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
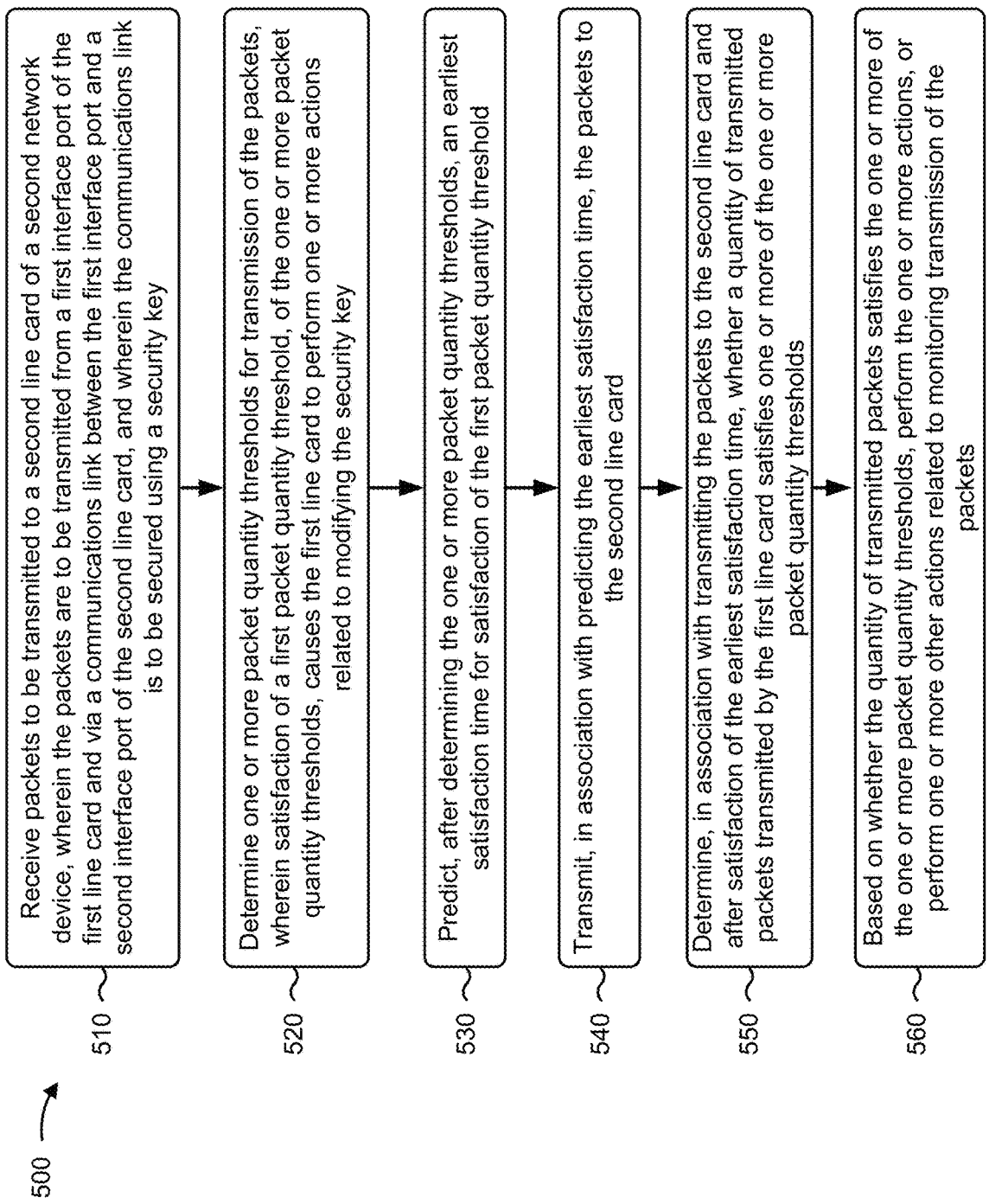
FIGS. 5-7 are flow charts of example processes for distributed predictive packet quantity threshold reporting.

FIG. 5 is a flow chart of an example process 500 for distributed predictive packet quantity threshold reporting. In some implementations, one or more process blocks of FIG. 5 may be performed by first line card (e.g., a first line card 324) of a first network device (e.g., a first network device 320). In some implementations, one or more process blocks of FIG. 5 may be performed by another device or a group of devices separate from or including the first line card, such as an endpoint device (e.g., endpoint device 310), the first network device, a daemon (e.g., daemon 322) of the first network device, a second network device (e.g., a second network device 320), and/or the like.

As shown in FIG. 5, process 500 may include receiving packets to be transmitted to a second line card of a second network device, wherein the packets are to be transmitted from a first interface port of the first line card and via a communications link between the first interface port and a second interface port of the second line card, and wherein the communications link is to be secured using a security key (block 510). For example, the first line card (e.g., using input component 405, controller 420, and/or the like) may receive packets to be transmitted to a second line card of a second network device, as described above. In some implementations, the packets are to be transmitted from a first interface port of the first line card and via a communications link between the first interface port and a second interface port of the second line card. In some implementations, the communications link is to be secured using a security key.

As further shown in FIG. 5, process 500 may include determining one or more packet quantity thresholds for transmission of the packets, wherein satisfaction of a first packet quantity threshold, of the one or more packet quantity thresholds, causes the first line card to perform one or more actions related to modifying the security key (block 520). For example, the first line card (e.g., using controller 420, and/or the like) may determine one or more packet quantity thresholds for transmission of the packets, as described above. In some implementations, satisfaction of a first packet quantity threshold, of the one or more packet quantity thresholds, causes the first line card to perform one or more actions related to modifying the security key.

As further shown in FIG. 5, process 500 may include predicting, after determining the one or more packet quantity thresholds, an earliest satisfaction time for satisfaction of the first packet quantity threshold (block 530). For example, the first line card (e.g., using controller 420, and/or the like) may predict, after determining the one or more packet quantity thresholds, an earliest satisfaction time for satisfaction of the first packet quantity threshold, as described above.

As further shown in FIG. 5, process 500 may include transmitting, in association with predicting the earliest satisfaction time, the packets to the second line card (block 540). For example, the first line card (e.g., using switching component 410, output component 415, controller 420, and/or the like) may transmit, in association with predicting the earliest satisfaction time, the packets to the second line card, as described above.

As further shown in FIG. 5, process 500 may include determining, in association with transmitting the packets to the second line card and after satisfaction of the earliest satisfaction time, whether a quantity of transmitted packets transmitted by the first line card satisfies one or more of the one or more packet quantity thresholds (block 550). For example, the first line card (e.g., using controller 420, and/or the like) may determine, in association with transmitting the packets to the second line card and after satisfaction of the earliest satisfaction time, whether a quantity of transmitted packets transmitted by the first line card satisfies one or more of the one or more packet quantity thresholds, as described above.

As further shown in FIG. 5, process 500 may include, based on whether the quantity of transmitted packets satisfies the one or more of the one or more packet quantity thresholds, performing the one or more actions, or performing one or more other actions related to monitoring transmission of the packets (block 560). For example, the first line card (e.g., using switching component 410, output component 415, controller 420, and/or the like) may, based on whether the quantity of transmitted packets satisfies the one or more of the one or more packet quantity thresholds, perform the one or more actions, or perform one or more other actions related to monitoring transmission of the packets, as described above.

Process 500 may include additional implementations, such as any single implementation or any combination of implementations described below and/or in connection with one or more other processes described elsewhere herein.

In a first implementation, the first line card may determine the first packet quantity threshold based on at least one of a cipher suite associated with a configuration on the first line card, or a set of factors related to the packets or to transmission of the packets. In a second implementation, alone or in combination with the first implementation, the first line card may determine a second packet quantity threshold, of the one or more packet quantity thresholds, based on the first packet quantity threshold.

In a third implementation, alone or in combination with one or more of the first and second implementations, the line card may predict the earliest satisfaction time based on a quantity of packets associated with the first packet quantity threshold, a data rate of the first interface port or the second interface port, and a smallest expected packet size of the packets. In a fourth implementation, in combination with the third implementation, the line card may divide the quantity of packets associated with the first packet quantity threshold by a result of dividing another quantity of packets associated with the data rate by the smallest expected packet size.

In a fifth implementation, alone or in combination with one or more of the first through fourth implementations, the line card may modify the security key to a new security key based on satisfaction of a second packet quantity threshold, of the one or more packet quantity thresholds, and not the first packet quantity threshold, or may notify a daemon of the first network device that the second packet quantity threshold has been satisfied to cause the daemon to modify the security key based on satisfaction of the second packet quantity threshold. In a sixth implementation, alone or in combination with one or more of the first through fifth implementations, the line card may determine whether the quantity of transmitted packets satisfies the first packet quantity threshold, prior to determining whether the quantity of transmitted packets satisfies a second packet quantity threshold of the one or more packet quantity thresholds, and may determine whether the quantity of transmitted packets satisfies the second packet quantity threshold based on determining that the quantity of transmitted packets fails to satisfy the first packet quantity threshold.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
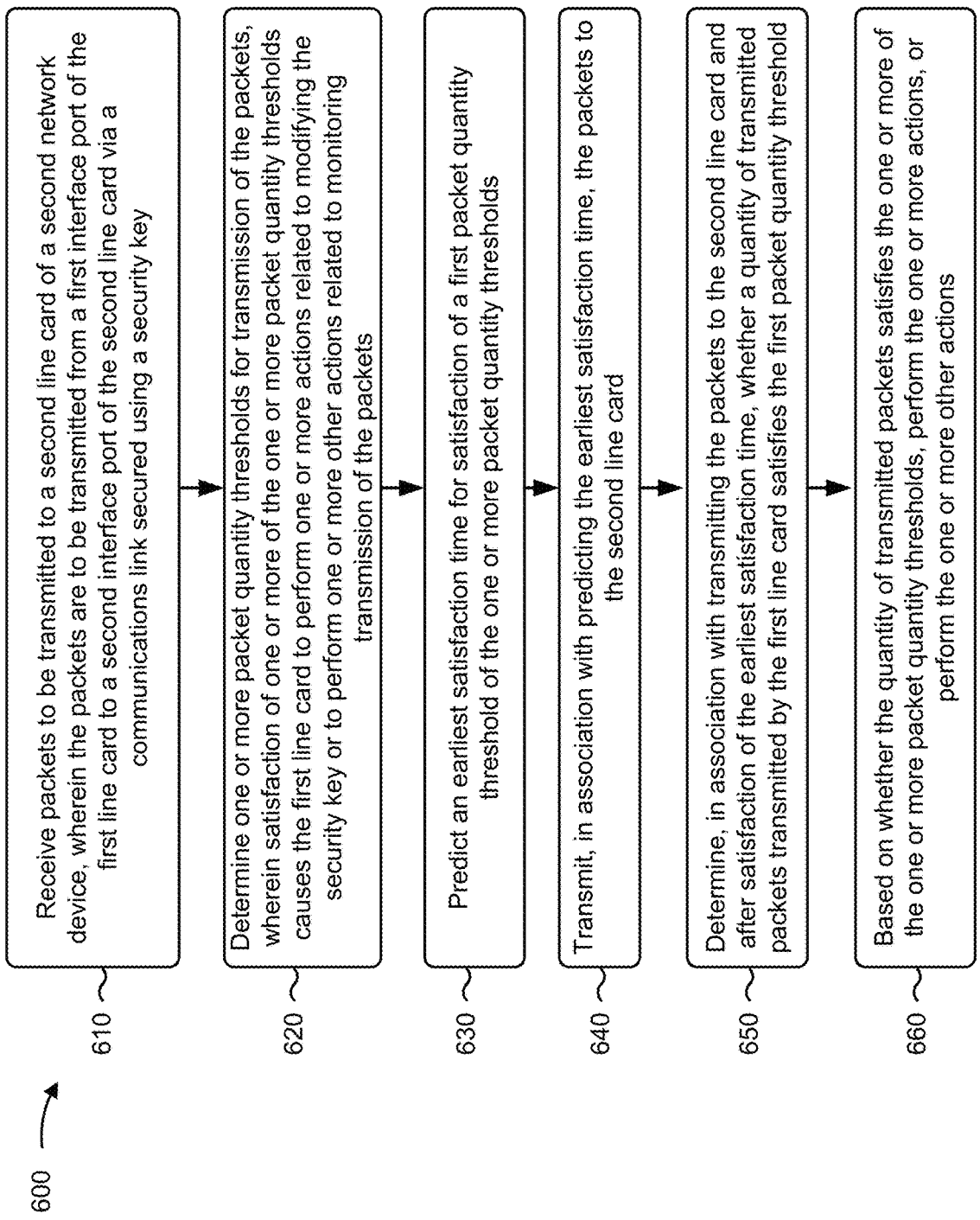

FIG. 6 is a flow chart of an example process 600 for distributed predictive packet quantity threshold reporting. In some implementations, one or more process blocks of FIG. 6 may be performed by a first line card (e.g., a first line card 324) of a first network device (e.g., a first network device 320). In some implementations, one or more process blocks of FIG. 6 may be performed by another device or a group of devices separate from or including the first line card, such as an endpoint device (e.g., endpoint device 310), the first network device, a daemon (e.g., daemon 322) of the first network device, a second network device (e.g., a second network device 320), and/or the like.

As shown in FIG. 6, process 600 may include receiving packets to be transmitted to a second line card of a second network device, wherein the packets are to be transmitted from a first interface port of the first line card to a second interface port of the second line card via a communications link secured using a security key (block 610). For example, the first line card (e.g., using input component 405, controller 420, and/or the like) may receive packets to be transmitted to a second line card of a second network device, as described above. In some implementations, the packets are to be transmitted from a first interface port of the first line card to a second interface port of the second line card via a communications link secured using a security key.

As further shown in FIG. 6, process 600 may include determining one or more packet quantity thresholds for transmission of the packets, wherein satisfaction of one or more of the one or more packet quantity thresholds causes the first line card to perform one or more actions related to modifying the security key or to perform one or more other actions related to monitoring transmission of the packets (block 620). For example, the first line card (e.g., using controller 420, and/or the like) may determine one or more packet quantity thresholds for transmission of the packets, as described above. In some implementations, satisfaction of one or more of the one or more packet quantity thresholds causes the first line card to perform one or more actions related to modifying the security key or to perform one or more other actions related to monitoring transmission of the packets.

As further shown in FIG. 6, process 600 may include predicting an earliest satisfaction time for satisfaction of a first packet quantity threshold of the one or more packet quantity thresholds (block 630). For example, the first line card (e.g., using controller 420, and/or the like) may predict an earliest satisfaction time for satisfaction of a first packet quantity threshold of the one or more packet quantity thresholds, as described above.

As further shown in FIG. 6, process 600 may include transmitting, in association with predicting the earliest satisfaction time, the packets to the second line card (block 640). For example, the first line card (e.g., using switching component 410, output component 415, controller 420, and/or the like) may transmit, in association with predicting the earliest satisfaction time, the packets to the second line card, as described above.

As further shown in FIG. 6, process 600 may include determining, in association with transmitting the packets to the second line card and after satisfaction of the earliest satisfaction time, whether a quantity of transmitted packets transmitted by the first line card satisfies the first packet quantity threshold (block 650). For example, the first line card (e.g., using controller 420, and/or the like) may determine, in association with transmitting the packets to the second line card and after satisfaction of the earliest satisfaction time, whether a quantity of transmitted packets transmitted by the first line card satisfies the first packet quantity threshold, as described above.

As further shown in FIG. 6, process 600 may include, based on whether the quantity of transmitted packets satisfies the one or more of the one or more packet quantity thresholds, performing the one or more actions, or performing the one or more other actions (block 660). For example, the first line card (e.g., using switching component 410, output component 415, controller 420, and/or the like) may, based on whether the quantity of transmitted packets satisfies the one or more of the one or more packet quantity thresholds, perform the one or more actions, or perform the one or more other actions, as described above.

Process 600 may include additional implementations, such as any single implementation or any combination of implementations described below and/or in connection with one or more other processes described elsewhere herein.

In a first implementation, the first line card may determine, in association with transmission of the packets, whether the quantity of transmitted packets satisfies the first packet quantity threshold, prior to determining whether the quantity of transmitted packets satisfies a second packet quantity threshold of the one or more packet quantity thresholds. In a second implementation, alone or in combination with the first implementation, the first line card may determine the first packet quantity threshold based on a cipher suite associated with a configuration on the first line card, wherein different cipher suites are associated with different packet quantity thresholds. In a third implementation, alone or in combination with one or more of the first and second implementations, the line card may modify the security key to a new security key based on satisfaction of the first packet quantity threshold, or may notify a daemon of the first network device that the first packet quantity threshold has been satisfied, to cause the daemon to modify the security key based on satisfaction of the first packet quantity threshold.

In a fourth implementation, alone or in combination with one or more of the first through third implementations, the first line card may determine a remaining quantity of packets for satisfaction of a second packet quantity threshold, of the one or more packet quantity thresholds, based on the quantity of transmitted packets failing to satisfy the second packet quantity threshold and the first packet quantity threshold, and may predict another earliest satisfaction time for satisfaction of the second packet quantity threshold based on the remaining quantity of packets. In a fifth implementation, in combination with the fourth implementation, the first line card may re-determine whether the quantity of transmitted packets satisfies the one or more of the one or more packet quantity thresholds after the other earliest satisfaction time has been satisfied. In a sixth implementation, alone or in combination with one or more of the first through fifth implementations, the line card may modify the security key to a new security key based on satisfaction of a second packet quantity threshold, of the one or more packet quantity thresholds, and not the first packet quantity threshold, or may notify a daemon of the first network device that the second packet quantity threshold has been satisfied, to cause the daemon to modify the security key based on satisfaction of the second packet quantity threshold.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
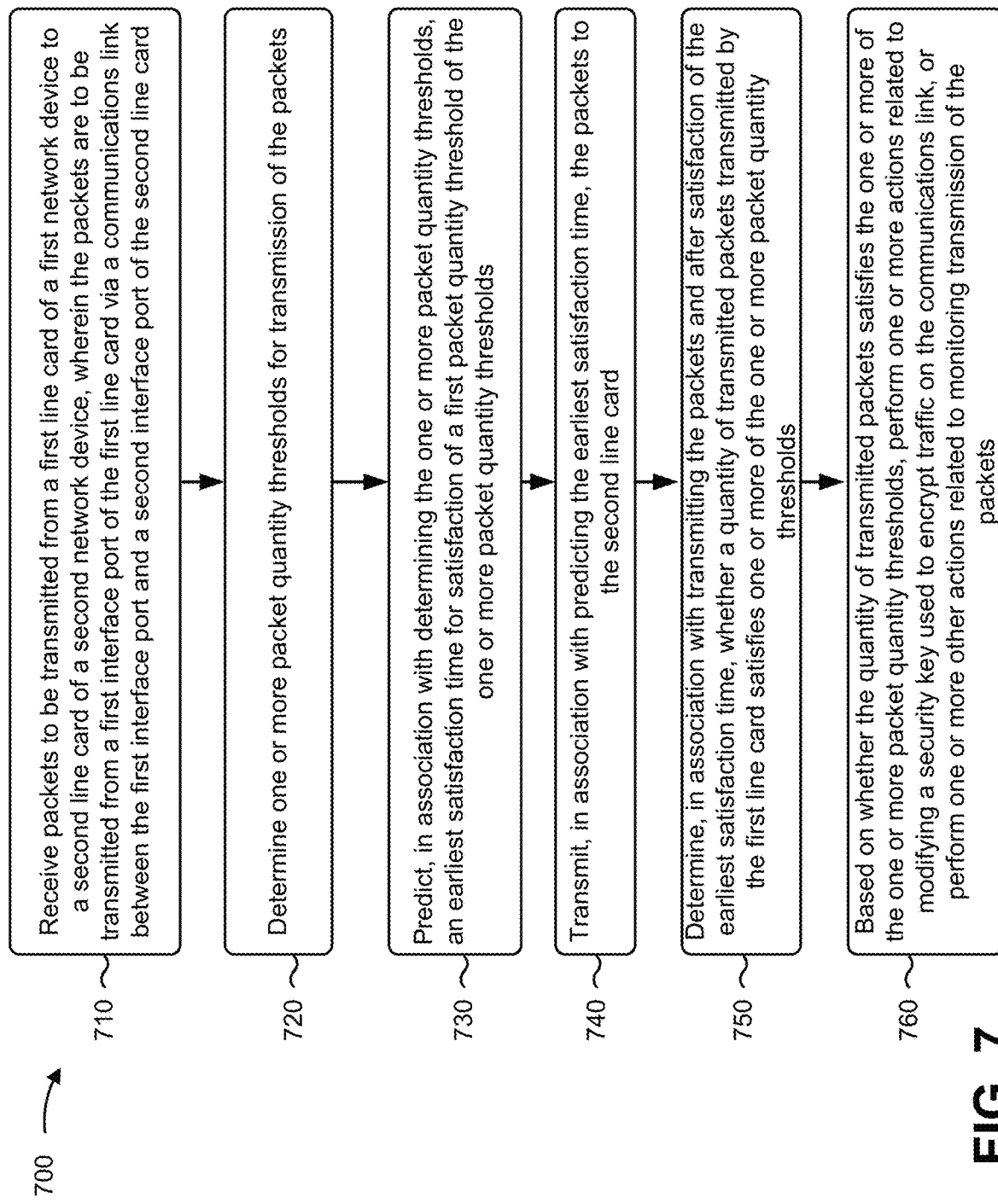

FIG. 7 is a flow chart of an example process 700 for distributed predictive packet quantity threshold reporting. In some implementations, one or more process blocks of FIG. 7 may be performed by a first line card (e.g., a first line card 324) of a first network device (e.g., a first network device 320). In some implementations, one or more process blocks of FIG. 7 may be performed by another device or a group of devices separate from or including the first line card, such as an endpoint device (e.g., endpoint device 310), the first network device, a daemon (e.g., daemon 322) of the first network device, a second network device (e.g., a second network device 320), and/or the like.

As shown in FIG. 7, process 700 may include receiving packets to be transmitted from a first line card of a first network device to a second line card of a second network device, wherein the packets are to be transmitted from a first interface port of the first line card via a communications link between the first interface port and a second interface port of the second line card (block 710). For example, the first line card (e.g., using input component 405, controller 420, and/or the like) may receive packets to be transmitted from a first line card of a first network device to a second line card of a second network device, as described above. In some implementations, the packets are to be transmitted from a first interface port of the first line card via a communications link between the first interface port and a second interface port of the second line card.

As further shown in FIG. 7, process 700 may include determining one or more packet quantity thresholds for transmission of the packets (block 720). For example, the first line card (e.g., using controller 420, and/or the like) may determine one or more packet quantity thresholds for transmission of the packets, as described above.

As further shown in FIG. 7, process 700 may include predicting, in association with determining the one or more packet quantity thresholds, an earliest satisfaction time for satisfaction of a first packet quantity threshold of the one or more packet quantity thresholds (block 730). For example, the first line card (e.g., using controller 420, and/or the like) may predict, in association with determining the one or more packet quantity thresholds, an earliest satisfaction time for satisfaction of a first packet quantity threshold of the one or more packet quantity thresholds, as described above.

As further shown in FIG. 7, process 700 may include transmitting, in association with predicting the earliest satisfaction time, the packets to the second line card (block 740). For example, the first line card (e.g., using switching component 410, output component 415, controller 420, and/or the like) may transmit, in association with predicting the earliest satisfaction time, the packets to the second line card, as described above.

As further shown in FIG. 7, process 700 may include determining, in association with transmitting the packets and after satisfaction of the earliest satisfaction time, whether a quantity of transmitted packets transmitted by the first line card satisfies one or more of the one or more packet quantity thresholds (block 750). For example, the first line card (e.g., using controller 420, and/or the like) may determine, in association with transmitting the packets and after satisfaction of the earliest satisfaction time, whether a quantity of transmitted packets transmitted by the first line card satisfies one or more of the one or more packet quantity thresholds, as described above.

As further shown in FIG. 7, process 700 may include, based on whether the quantity of transmitted packets satisfies the one or more of the one or more packet quantity thresholds, performing one or more actions related to modifying a security key used to encrypt traffic on the communications link, or performing one or more other actions related to monitoring transmission of the packets (block 760). For example, the first line card (e.g., using switching component 410, output component 415, controller 420, and/or the like) may, based on whether the quantity of transmitted packets satisfies the one or more of the one or more packet quantity thresholds, perform one or more actions related to modifying a security key used to encrypt traffic on the communications link, or may perform one or more other actions related to monitoring transmission of the packets, as described above.

Process 700 may include additional implementations, such as any single implementation or any combination of implementations described below and/or in connection with one or more other processes described elsewhere herein.

In a first implementation, the first line card may predict the earliest satisfaction time based on a quantity of packets associated with a first packet quantity threshold of the one or more packet quantity thresholds, a data rate of the first interface port or the second interface port, and a smallest expected packet size of the packets. In a second implementation, in combination with the first implementation, the first line card may divide the quantity of packets associated with the first packet quantity threshold by a result of dividing another quantity of packets associated with the data rate by the smallest expected packet size.

In a third implementation, alone or in combination with one or more of the first and second implementations, the first line card may determine a remaining quantity of packets for satisfaction of a second packet quantity threshold, of the one or more packet quantity thresholds, based on the quantity of transmitted packets failing to satisfy the second packet quantity threshold and the first packet quantity threshold, and may predict another earliest satisfaction time for satisfaction of the second packet quantity threshold based on the remaining quantity of packets. In a fourth implementation, in combination with the third implementation, the first line card may re-determine whether the quantity of transmitted packets satisfies the one or more of the one or more packet quantity thresholds after the other earliest satisfaction time has been satisfied. In a fifth implementation, alone or in combination with one or more of the first through fourth implementations, the first line card may modify the security key used to encrypt the communications link to a new security key based on satisfaction of a second packet quantity threshold and not the first packet quantity threshold, or may notify a daemon of the first network device that the second packet quantity threshold has been satisfied, to cause the daemon to modify the security key based on satisfaction of the second packet quantity threshold.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a first line card of a first network device, packets to be transmitted to a second line card of a second network device,
      wherein the packets are to be transmitted from a first interface port of the first line card and via a communications link between the first interface port and a second interface port of the second line card,
         wherein the communications link is to be secured using a security key;
   determining, by the first line card, one or more packet quantity thresholds for transmission of the packets,
      wherein satisfaction of a first packet quantity threshold, of the one or more packet quantity thresholds, causes the first line card to perform one or more actions related to modifying the security key;
   predicting, by the first line card and after determining the one or more packet quantity thresholds, an earliest satisfaction time for satisfaction of the first packet quantity threshold;
   transmitting, by the first line card and in association with predicting the earliest satisfaction time, the packets to the second line card;
   determining, by the first line card in association with transmitting the packets to the second line card and after satisfaction of the earliest satisfaction time, whether a quantity of transmitted packets transmitted by the first line card satisfies one or more of the one or more packet quantity thresholds; and
   based on whether the quantity of transmitted packets satisfies the one or more of the one or more packet quantity thresholds:
      performing the one or more actions, or
      performing one or more other actions related to monitoring transmission of the packets.

2. The method of claim 1, wherein determining the one or more packet quantity thresholds comprises:
   determining the first packet quantity threshold based on at least one of:
      a cipher suite associated with a configuration on the first line card, or
      a set of factors related to the packets or to transmission of the packets.

3. The method of claim 1, wherein determining the one or more packet quantity thresholds comprises:
   determining a second packet quantity threshold, of the one or more packet quantity thresholds, based on the first packet quantity threshold,
      wherein the second packet quantity threshold is at least one of:

a quantity of packets associated with a shorter transmission time than the first packet quantity threshold, or a percentage of the first packet quantity threshold.

4. The method of claim 1, wherein predicting the earliest satisfaction time comprises predicting the earliest satisfaction time based on:

a quantity of packets associated with the first packet quantity threshold, a data rate of the first interface port or the second interface port, and a smallest expected packet size of the packets.

5. The method of claim 4, wherein predicting the earliest satisfaction time comprises:

dividing the quantity of packets associated with the first packet quantity threshold by a result of dividing another quantity of packets associated with the data rate by the smallest expected packet size.

6. The method of claim 1, wherein performing the one or more actions comprises:

modifying the security key to a new security key based on satisfaction of a second packet quantity threshold, of the one or more packet quantity thresholds, and not the first packet quantity threshold, or notifying a daemon of the first network device that the second packet quantity threshold has been satisfied to cause the daemon to modify the security key based on satisfaction of the second packet quantity threshold.

7. The method of claim 1, wherein determining whether the quantity of transmitted packets satisfies the one or more of the one or more packet quantity thresholds comprises:

determining whether the quantity of transmitted packets satisfies the first packet quantity threshold, prior to determining whether the quantity of transmitted packets satisfies a second packet quantity threshold of the one or more packet quantity thresholds; and determining whether the quantity of transmitted packets satisfies the second packet quantity threshold based on determining that the quantity of transmitted packets fails to satisfy the first packet quantity threshold.

8. A first line card of a first network device, comprising:

one or more memories; and one or more processors, communicatively coupled to the one or more memories, to:

receive packets to be transmitted to a second line card of a second network device, wherein the packets are to be transmitted from a first interface port of the first line card to a second interface port of the second line card via a communications link secured using a security key;

determine one or more packet quantity thresholds for transmission of the packets, wherein satisfaction of one or more of the one or more packet quantity thresholds causes the first line card to perform one or more actions related to modifying the security key or to perform one or more other actions related to monitoring transmission of the packets;

predict an earliest satisfaction time for satisfaction of a first packet quantity threshold of the one or more packet quantity thresholds;

transmit, in association with predicting the earliest satisfaction time, the packets to the second line card;

determine, in association with transmitting the packets to the second line card and after satisfaction of the earliest satisfaction time, whether a quantity of transmitted packets transmitted by the first line card satisfies the first packet quantity threshold; and based on whether the quantity of transmitted packets satisfies the one or more of the one or more packet quantity thresholds:

perform the one or more actions, or perform the one or more other actions.

9. The first line card of claim 8, wherein the one or more processors, when determining whether the quantity of transmitted packets satisfies the one or more of the one or more packet quantity thresholds, are to:

determine, in association with transmission of the packets, whether the quantity of transmitted packets satisfies the first packet quantity threshold prior to determining whether the quantity of transmitted packets satisfies a second packet quantity threshold of the one or more packet quantity thresholds.

10. The first line card of claim 8, wherein the one or more processors, when determining the one or more packet quantity thresholds, are to:

determine the first packet quantity threshold based on a cipher suite associated with a configuration on the first line card, wherein different cipher suites are associated with different packet quantity thresholds.

11. The first line card of claim 8, wherein the one or more processors, when performing the one or more actions, are to:

modify the security key to a new security key based on satisfaction of the first packet quantity threshold, or notify a daemon of the first network device that the first packet quantity threshold has been satisfied, to cause the daemon to modify the security key based on satisfaction of the first packet quantity threshold.

12. The first line card of claim 8, wherein the one or more processors, when performing the one or more other actions, are to:

determine a remaining quantity of packets for satisfaction of a second packet quantity threshold, of the one or more packet quantity thresholds, based on the quantity of transmitted packets failing to satisfy the second packet quantity threshold and the first packet quantity threshold; and predict another earliest satisfaction time for satisfaction of the second packet quantity threshold based on the remaining quantity of packets.

13. The first line card of claim 12, wherein the one or more processors, when performing the one or more actions, are to:

re-determine whether the quantity of transmitted packets satisfies the one or more of the one or more packet quantity thresholds after the other earliest satisfaction time has been satisfied.

14. The first line card of claim 8, wherein the one or more processors, when performing the one or more actions, are to:

modify the security key to a new security key based on satisfaction of a second packet quantity threshold, of the one or more packet quantity thresholds, and not the first packet quantity threshold, or notify a daemon of the first network device that the second packet quantity threshold has been satisfied to cause the daemon to modify the security key based on satisfaction of the second packet quantity threshold.

15. A non-transitory computer-readable medium storing instructions, the instructions comprising:

one or more instructions that, when executed by one or more processors, cause the one or more processors to:

receive packets to be transmitted from a first line card of a first network device to a second line card of a second network device,
   wherein the packets are to be transmitted from a first interface port of the first line card via a communications link between the first interface port and a second interface port of the second line card;

determine one or more packet quantity thresholds for transmission of the packets;

predict, in association with determining the one or more packet quantity thresholds, an earliest satisfaction time for satisfaction of a first packet quantity threshold of the one or more packet quantity thresholds;

transmit, in association with predicting the earliest satisfaction time, the packets to the second line card;

determine, in association with transmitting the packets and after satisfaction of the earliest satisfaction time, whether a quantity of transmitted packets transmitted by the first line card satisfies one or more of the one or more packet quantity thresholds; and based on whether the quantity of transmitted packets satisfies the one or more of the one or more packet quantity thresholds:
   perform one or more actions related to modifying a security key used to encrypt traffic on the communications link, or
   perform one or more other actions related to monitoring transmission of the packets.

16. The non-transitory computer-readable medium of claim 15, wherein the one or more instructions, that cause the one or more processors to predict the earliest satisfaction time, cause the one or more processors to:
   predict the earliest satisfaction time based on:
      a quantity of packets associated with the first packet quantity threshold of the one or more packet quantity thresholds,
      a data rate of the first interface port or the second interface port, and
      a smallest expected packet size of the packets.

17. The non-transitory computer-readable medium of claim 16, wherein the one or more instructions, that cause the one or more processors to predict the earliest satisfaction time, cause the one or more processors to:
   divide the quantity of packets associated with the first packet quantity threshold by a result of dividing another quantity of packets associated with the data rate by the smallest expected packet size.

18. The non-transitory computer-readable medium of claim 15, wherein the one or more instructions, that cause the one or more processors to perform the one or more other actions, cause the one or more processors to:
   determine a remaining quantity of packets for satisfaction of a second packet quantity threshold, of the one or more packet quantity thresholds, based on the quantity of transmitted packets failing to satisfy the second packet quantity threshold and the first packet quantity threshold; and
   predict another earliest satisfaction time for satisfaction of the second packet quantity threshold based on the remaining quantity of packets.

19. The non-transitory computer-readable medium of claim 18, wherein the one or more instructions, that cause the one or more processors to perform the one or more actions, cause the one or more processors to:
   re-determine whether the quantity of transmitted packets satisfies the one or more of the one or more packet quantity thresholds after the other earliest satisfaction time has been satisfied.

20. The non-transitory computer-readable medium of claim 15, wherein the one or more instructions, that cause the one or more processors to perform the one or more other actions, cause the one or more processors to:
   modify the security key used to encrypt the communications link to a new security key based on satisfaction of a second packet quantity threshold and not the first packet quantity threshold, or
   notify a daemon of the first network device that the second packet quantity threshold has been satisfied, to cause the daemon to modify the security key based on satisfaction of the second packet quantity threshold.

\* \* \* \* \*